United States Patent [19]

Feltgen et al.

[11] Patent Number: 5,135,997
[45] Date of Patent: Aug. 4, 1992

[54] PROCESS FOR THE SOLID PHASE POLYMERIZATION OF ACRYLONITRILE FROM THE GASEOUS PHASE

[75] Inventors: Karl-Heinz Feltgen, Dormagen; Rüdiger Franck, Cologne; Konrad Hable, Leverkusen; Siegfried Korte, Odenthal; Manfred Heckenbach, Pulheim, all of Fed. Rep. of Germany

[73] Assignee: Bayer Aktiengesellschaft, Leverkusen, Fed. Rep. of Germany

[21] Appl. No.: 582,247

[22] Filed: Sep. 14, 1990

[30] Foreign Application Priority Data

Sep. 26, 1989 [DE] Fed. Rep. of Germany ....... 3932018

[51] Int. Cl.$^5$ .............................................. C08F 2/34
[52] U.S. Cl. .................................. 526/201; 526/341; 526/342; 526/220; 526/225; 525/242; 525/255; 525/259; 525/261
[58] Field of Search ................. 526/341, 342, 68, 201; 525/242, 255, 259, 261, 309, 311, 315, 316, 317, 319, 322, 324

[56] References Cited

U.S. PATENT DOCUMENTS 2,961,432 11/1960 Fikentscher .................... 526/341 X
3,787,365 1/1974 Melacini ........................ 526/341 X

FOREIGN PATENT DOCUMENTS 0138224 4/1985 European Pat. Off. .

Primary Examiner—Joseph L. Schofer
Assistant Examiner—Mark Nagumo
Attorney, Agent, or Firm—Connolly & Hutz

[57] ABSTRACT

This invention relates to a process for the radical homo- or copolymerization of acrylonitrile with one or more copolymerizable monomers under reaction conditions such that the monomers are present predominantly in a gaseous form of an adsorbed form and polymerization of the monomers, which are presumably adsorbed, takes place in the solid phase (solvent-free polymerization) and results in pulverulent PAN-(co)polymers. The process is preferably carried out in the presence of small quantities of a mediator substance such as dimethylformamide which does not alter the pulverulent consistency of the PAN-polymers but leads considerably more rapidly and with much improved yields to freshly formed polyacrylonitrile polymers.

6 Claims, 2 Drawing Sheets

PROCESS FOR THE SOLID PHASE POLYMERIZATION OF ACRYLONITRILE FROM THE GASEOUS PHASE

This invention relates to a process for the radical homo- or copolymerisation of acrylonitrile with one or more copolymerisable monomers under reaction conditions such that the monomers are present predominantly in a gaseous form or an adsorbed form and polymerisation takes place by way of presumably adsorbed monomers in the solid phase (solvent-free polymerisation) and leads to pulverulent PAN-(co)polymers. The process is preferably carried out in the presence of a mediator substance such as dimethylformamide used in such small quantity that it does not alter the pulverulent consistency of the PAN-polymers but leads considerably more rapidly and with considerably higher yields to the freshly formed polyacrylonitrile polymers.

The best known processes for the polymerisation of acrylonitrile (hereinafter referred to as AN) to polyacrylonitrile or its copolymers (PAN) are precipitation polymerisation and solution polymerisation. These processes all take place in the liquid phase which consists substantially of one or more monomers and a diluent or solvent. The polymer is either suspended (non-solvent for PAN) or dissolved (in solvents for PAN) in the liquid phase.

The above-mentioned processes have the disadvantage that if the polymer is to be subjected to further processing, the liquid phase (solvent, residual monomers, etc.) must be removed from the polymer either completely (if a pure polymer is required) or with the exception of the solvent (if, in the case of solution polymerisation, a polymer solution is to be prepared). If the liquid phase is to be removed completely, the polymer must be washed and dried before further processing. The separated liquid phase must be purified and separated into its constituents before being returned into the process.

These disadvantages, which are inherent in all liquid phase processes due to the need for subsequent working up, do not occur in solvent-free polymerisation of monomers from the gaseous phase and it is for this reason that processes employing this principle have already been developed for the polymerisation of monomers such as ethylene, propylene and vinyl chloride. The polymerisation of ethylene and propylene is catalysed by organo-metallic compounds while vinyl chloride is polymerised in the presence of a radical initiator. These processes all operate at much higher pressures than are normally physically possible for the polymerisation of acrylonitrile on account of the vapour pressure/temperature relationship of the monomers used in the homo- or copolymerisation of acrylonitrile and the reaction temperatures conventionally employed for such polymerisations. At 60° C., for example, the vapour pressure of vinyl chloride is about 9650 hPa whereas that of AN is in the subatmospheric region of about 540 hPa.

Polymerisation of AN from the gaseous phase has hitherto in most cases been carried out with the object of modifying other finely divided substances such as PVC powders or cellulose fibres by graft polymerisation (see EP-A-138 224, in which a gaseous catalyst for graft reactions is claimed; I. Yu. Babkin et al, Khimicheskie Volokna, No.3, pages 13-15 (1970) describe the surface modification of ultra-fine PVC fibres by γ-ray-induced grafting with AN; D. A. Kritskaja et al, Vysokomol. Soedin. Ser. A 21 (5), 1107-13 (1980) describe pulverulent polymers of polyolefins which inter alia are provided with a functional coating by radiation chemical grafting with (inter alia) AN).

The low polymerisation rates (hereinafter abbreviated to RP) realised in these processes and the low mass ratios of the freshly formed polymer to the starting material (seed) substrate (hereinafter referred to as product/seed ratio) are sufficient for a graft polymerisation but not for AN solvent-free polymerisation to form polyacrylonitrile (co)polymers. In the above-mentioned processes, the substrate to be modified is introduced into an AN atmosphere which is either pure or diluted with inert gas and grafting on the substrate is released either by irradiation with γ-rays or by means of an initiator previously applied to the substrate surface.

AN is mentioned in U.S. Pat. No. 3,595,840 as a possible monomer for polymerisation from the gaseous phase but no examples of embodiments are given and AN is liquid under the reaction conditions proposed. PVC polymerisation reactions are carried out in which the polymer obtained is ground down and is introduced in this size reduced form into the reactor for further reaction. Without this grinding process, polymerisation virtually comes to a standstill.

Only one work is known (T. T. Jones and H. W. Melville, Proc. Roy. Soc. (London), Ser. A,187, 37 (1946)) in which experiments for gaseous phase homopolymerisation of AN are described. In this work, attempts were made to polymerise AN photochemically in the presence of acetone as photo-initiator and in the gaseous phase. The RP obtained was very low, amounting to only a few grams of polymer per hour and per cubic meter of reaction volume.

Pure solvent-free polymerisation of liquid AN is virtually impossible to control in practice since the mass becomes increasingly more viscous as polymerisation proceeds until it can no longer be stirred and the heat of reaction is then extremely difficult to remove. This process has therefore not found acceptance in the practice.

In contrast to graft polymerisation, conventional solid/solvent-free polymerisation from the gaseous phase which is to lead directly to pulverulent solids requires a much higher reaction rate and a considerably greater product/seed ratio to be realised if the process is to be industrially/economically acceptable. For this reason, the observations previously made on the graft polymerisation of AN from the gaseous phase are no indication that the process of conventional solid/solvent free polymerisation from the gaseous phase can be applied to the preparation of AN homo- or copolymers.

When examining the state of the art, therefore, it is found that polymerisation from the gaseous phase was generally recognised to have advantages over polymerisation from the liquid phase. Such processes have in fact been developed for monomers which have a high vapour pressure compared with that of AN but for the homo- or copolymerisation of AN there have hitherto not been any technically satisfactory examples available, let alone processes which could be employed in practice.

It was an object of the present invention to carry out solid/solvent-free polymerisation of AN from the gaseous phase to produce pulverulent solids with the object of realising a suitable (continuous) reaction and achieving industrially acceptable reaction rate and high yields of PAN(co)polymers.

It has now been found that acrylonitrile, alone or together with other, copolymerisable monomers, may be polymerised continuously or batchwise at a high reaction rate under pressure and temperature conditions at which the monomer or monomers is or are in thermodynamic equilibrium in a gaseous or adsorbed form and optionally in the presence of an inert gas to produce a polymer powder having a surprisingly high bulk density (preferably $\geq 300$ kg/m$^3$, in particular $\geq 600$ kg/m$^3$), optionally with dye absorbing acid groups from certain radical starter systems built into the polymer. This polymerisation is achieved if the reactor contains a seed polymer in the form of a powder which has been mixed and whirled up by stirring or some other technique and if the temperature is from 30° to 120° C. and the acrylonitrile partial pressure is from 80 to 3200 hPa and amounts to 50 to 100% of the saturation vapour pressure of the AN vapour phase and if one or more polymerisation initiators and optionally a mediator substance (preferably a solvent for polyacrylonitrile), is-/are continuously added to the polymer powder in such quantities that the PAN(co)polymer powder remains in a stirrable/miscible state, and molecular weight regulators are optionally also used.

The present invention thus relates to a process for the preparation of polyacrylonitrile polymers and polyacrylonitrile copolymers by solid phase polymerisation of acrylonitrile from the gaseous phase in the presence of initiators and in the presence of solid substances introduced into the reactor before the reaction, characterised in that a) acrylonitrile, alone or together with other copolymerisable monomers, is reacted b) under pressure and temperature conditions at which, in thermodynamic equilibrium conditions, the monomer and optionally comonomers are present in a gaseous or adsorbed form, i.e. at temperatures from 30° to 120° C., preferably at 40° to 90° C., in particular at 45° to 70° C., under an acrylonitrile partial pressure of from 80 to 3200 hPa and a saturation value $P_M/P_M^o$ (ratio of actual vapour partial pressure $P_M$ and the saturation vapour pressure $P_M^o$ of the monomer or monomers) of from 0.5 to 1, preferably from 0.75 to 0.97, with substantial exclusion of oxygen c) in the presence of a PAN-(co)polymer as pulverulent seed polymer and d) in the presence of initiators which are virtually non-volatile under the reaction conditions, e) optionally in the presence of liquid mediator substances which are solvents or powerful swelling agents for PAN-homo- or copolymers, in particular highly polar organic amide, sulphoxide, sulphone or phosphoramide compounds, in particular dimethylformamide, dimethylacetamide or dimethylsulphoxide, in such small quantities that the seed polymer c) can still be stirred as a powder, preferably in quantities of from 0.1 to 15% by weight, based on the quantity of PAN-(co)polymer present, more preferably in quantities of from 0.5 to 15% by weight, in particular from 3 to 10% by weight, f) optionally in the presence of inert gases, at a high reaction rate leading to a doubling of the quantity of seed powder mass introduced within a period $\tau$ of $<15$ hours, preferably less than 10, in particular $<8$ hours, to yield pulverulent PAN-(co)polymers, the liquid acrylonitrile being introduced over or into the PAN-(co)polymer initially provided while the latter is kept in motion, and the process being controlled to keep the saturation value $P_M/P_M^o$ within the limits claimed and excess monomers being condensed outside the reaction vessel and recycled in the liquid form into the reaction vessel, and the initiators and, if indicated, mediator substances being introduced continuously or intermittently into at least one of the feed streams. (The index M in the expression for the pressures means that the partial pressure of the monomers is to be used).

BRIEF DESCRIPTION OF THE DRAWING

FIG. 1 is a flow-chart drawing of the apparatus used in the process of this invention.

Figure 1:
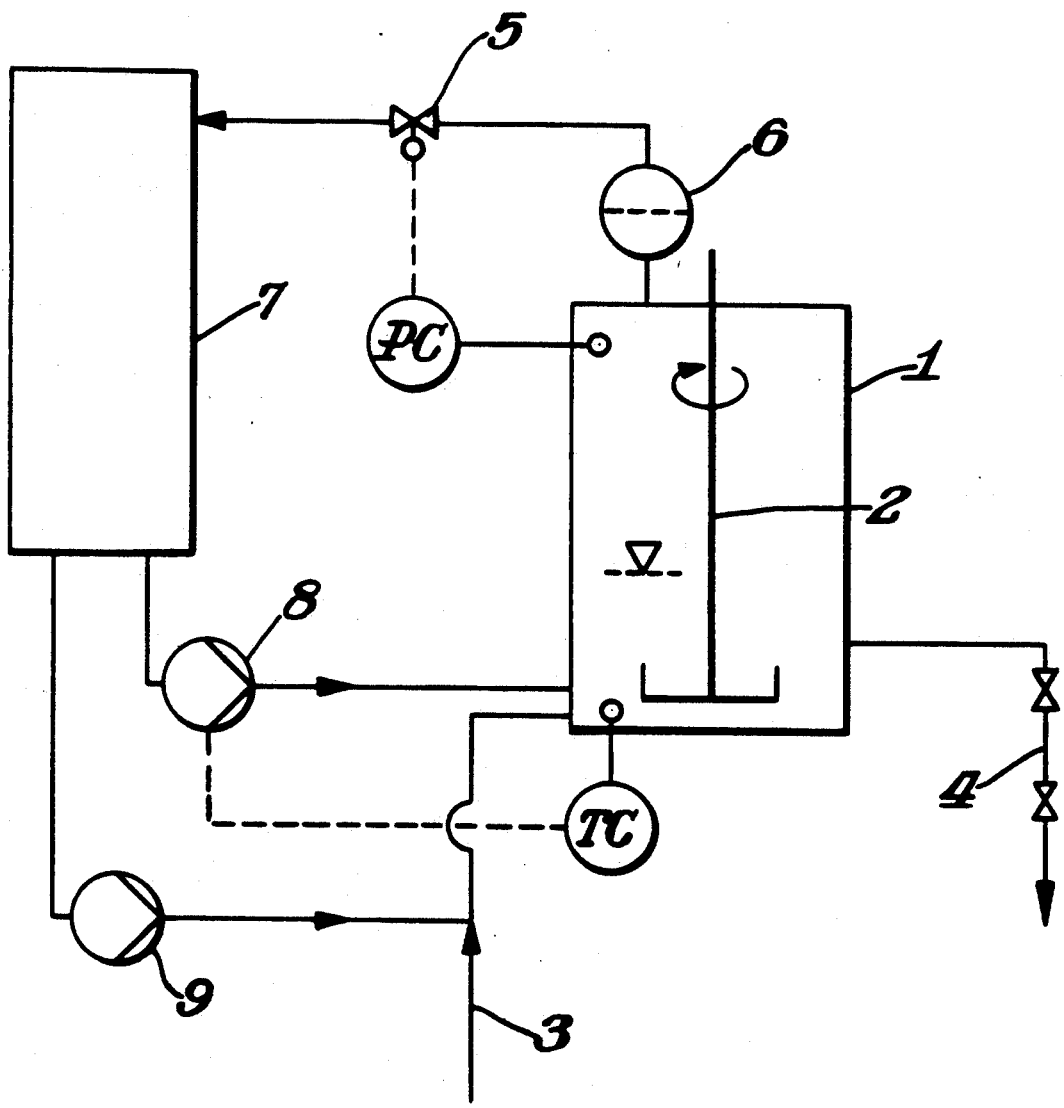
FIG. 1 illustrates the process of this invention in a flow circuit.

The process according to the invention may be used both for the preparation of a PAN-homopolymer and for the preparation of a PAN-copolymer (acrylic and modacrylic polymers). The copolymerisable monomers used may in principle be any monomers known for the copolymerisation of AN. The acrylic copolymers should contain at least 40% by weight of acrylonitrile, preferably $\geq 85\%$ by weight of acrylonitrile, most preferably $>90\%$ by weight of acrylonitrile. Acrylic and methacrylic acid esters and vinyl carboxylic acids are comonomers conventionally used. Vinyl acetate and methyl acrylate are particularly suitable but other comonomers capable of being reacted in the gaseous phase under the reaction conditions mentioned may also be used, e.g. styrene and its derivatives and vinylically unsaturated hydrocarbons which are optionally halogenated, e.g. ethylene, propylene, isobutene, butadiene, vinyl chloride, vinylidene chloride and the like.

Polymerisation by the process according to the invention requires the presence of a starting or seed substrate at the beginning of the reaction. The seed substrate should be a polymer powder with good sorption properties for the monomers to be polymerised. Polyacrylonitrile (PAN) and its copolymers are preferably used. The seed powder is introduced into the reaction vessel and the vessel is then completely freed from gaseous impurities by evacuation followed by optionally repeated flushing with inert gases (such as nitrogen) and finally by evacuation. Oxygen in particular inhibits the polymerisation reaction, even when present in only very small quantities.

The polymer powder is adjusted to the reaction temperature with stirring. This temperature may be from 30° to 120° C. and is preferably from 40° to 90° C., in particular from 45° to 70° C.

When the reaction temperature has been reached, the reaction pressure is adjusted by the introduction of (liquid) monomer or a mixture of (liquid) monomers into the heated reactor. Evaporation of the monomer liquids causes the pressure to rise. When the desired pressure level has been reached, any excess monomer vapour present is released, e.g. through a control valve, and liquefied in a condenser, which is connected to the reactor. The reaction pressure may also be adjusted by means of, for example, an automatically controlled condenser.

The AN partial pressure or partial pressure of the monomer mixture in the reactor may be from 80 hPa to 3200 hPa, depending on the reaction temperature. The AN (partial) pressure is adjusted so that the saturation value $P_M/P_M^o$, i.e. the ratio of actual vapour pressure $p_M$ to saturation vapour pressure $P_M^o$ of the monomer or monomer mixture has a value of from 0.5 to 1, preferably from 0.75 to 0.97. From 0.83 to 0.95 saturation has been found to be particularly advantageous. The reaction vessel may thus be at reduced pressure but an inert gas may be introduced at normal or excess pressure to prevent the invasion of air/oxygen.

The liquid monomer is directly introduced to the powder bed (preferably at a point below the surface of the bed) and becomes uniformly distributed in the powder without significantly affecting the flowability of the powder. The monomer evaporates almost immediately or is immediately absorbed so that virtually no liquid phase is then present in the (seed) PAN polymer. It is assumed that sorption of acrylonitrile on the substrate of PAN solid decisively influences the course of subsequent polymerisation.

With exception of the starting phase of the reaction, the heat required for evaporation is supplied by the heat of polymerisation released (for PAN $\Delta_R H = -76.5$ kJ/mol). This heat of reaction is, once the steady state is reached, greater than the heat needed to evaporate the monomer which is used up by polymerisation. Therefore, the temperature in the reactor is controlled by recycling the released excess monomer which is reliquefied in the condenser. The monomer absorbs the excess heat of the polymerisation reaction as it evaporates again in the reactor.

The polymerisation initiator and optionally the mediator substance may be introduced into the reactor as a solution in or mixture with the monomer or monomer mixture. Alternatively, the monomers may be introduced separately from the mediator substance, which may contain the initiator in solution. The method of introduction into the reactor may be varied as suitable, e.g. with separate introduction of redox initiator components or taking into account the recycled AN monomer streams.

Polymerisation may be carried out with the aid of a conventional molecular weight regulator, e.g. a mercaptan, for adjusting the molecular weights to the required order of magnitude since solid phase polymerisation normally results in relatively high molecular weights.

The polymerisation initiators used may be any of the known initiator substances used for the homo- and copolymerisation of acrylonitrile. Substances which have a vapour pressure below 10 hPa, preferably below 3 hPa, at the reaction temperature are particularly suitable as they do not enter the condenser together with the excess monomer vapour and therefore cannot lead to polymerisation in the liquid phase.

The initiators used are preferably radical initiators which are activated either by thermal decomposition or by a redox reaction. When redox systems containing reducible sulphur compounds are used, including gaseous $SO_2$, dye absorbing, weak to strong acid groups in the form of sulphonate groups are built into the polymer.

When the initiator used is one which can be activated by heat, the liquid monomer containing the initiator is cooled until it enters the reaction chamber. Liquid phase polymerisation in the conduits is thereby prevented.

When a redox-initiator system consisting of an oxidation component and a reduction component is used, the two components (which may be dissolved in monomers) are introduced into the reactor through separate conduits in order to prevent liquid phase polymerisation in the conduits.

When a redox-initiator system is used, it may be advantageous to use an initiator substance with a low vapour pressure (e.g. a hydroperoxide having an alkyl group with more than 12 carbon atoms) as one reactant and a gas (e.g. $SO_2$ or a (tertiary) amine) as the other reactant. The advantage of such a choice of components of the initiator system is that the two components can readily come into contact and react with one another owing to the great mobility of the gaseous component. Moreover, the low vapour pressure of one component ensures that also in this embodiment of the process according to the invention there is no risk of unwanted polymerisation of the monomer.

Regardless of the choice of initiator system, it may be advantageous to use not just one initiator but a mixture of initiators so that the decomposition characteristic can be adjusted to a value suitable for controlling the polymerisation process or synergistic effects, i.e. effects which accelerate polymerisation, can be utilized.

It is advantageous to dissolve the initiator(s) or the less volatile components of the initiator system as well as other non-volatile additives in as large a quantity of monomers and/or mediator substance as possible so that when the reaction solution is introduced into the reaction zone the non-volatile substances will be uniformly distributed on the powder.

Among the class of thermally activated initiators, those which have a half life of from 5 min to 5 h at the reaction temperature are particularly suitable.

One group from the class of suitable thermally activated initiators comprises the azo compounds, in particular azonitriles, which are characterised by the following general structural formula:

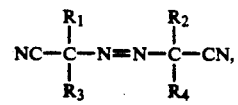

in which the end groups $R_1$, $R_2$, $R_3$ and $R_4$ may be hydrogen or alkyl, cycloalkyl or aralkyl radicals which may be substituted with halogens and contain 1 to 10 carbon atoms.

Another group of suitable radical initiators comprising the dialkylperoxides, peracids, diacylperoxides, peresters and peroxides containing sulphonyl groups is characterised by the following structural formula:

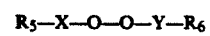

wherein the end groups, $R_5$ and $R_6$, may be hydrogen or alkyl, cycloalkyl, aryl, alkaryl, aralkyl, alkylcycloalkyl or cycloalkylalkyl radicals which may be halogenated and contain 1 to 15 carbon atoms. The groups X and Y may have the following meanings:

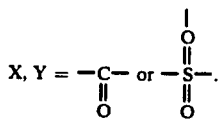

One of the groups, X or Y, may be omitted or they may both be omitted.

The dialkylperoxidicarbonates, which are characterised by the following structural formula:

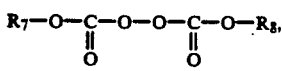

in particular dicyclohexylperoxidicarbonate, diisopropylperoxidicarbonate and di-2-ethylhexylperoxidicarbonate, have been found to be particularly suitable thermally activated initiators. The end groups $R_7$ and $R_8$ may be alkyl, cycloalkyl, aryl, alkaryl, aralkyl, alkylcycloalkyl, alkenyl, cycloalkenyl, alkylcycloalkenyl or cycloalkylalkenyl radicals which contain 1 to 20 carbon atoms and may be halogenated.

The following are examples from the above-mentioned groups: Azo-bis(isobutyronitrile); azo-bis(2,4-dimethylvaleronitrile); dicumyl peroxide; t-butyl-cumyl peroxide; bis-(2,4-dichlorobenzoyl)-peroxide; dilauroyl peroxide; didecanoyl peroxide; dicyclohexyl peroxide; dibenzoylperoxide; bis-(2-methyl-2-benzoyl)-peroxide; acetyl-cyclohexane-sulphonyl-peroxide; t-butyl-perneodecanoate; cumylperneodecanoate; t-amyl-perneodecanoate; t-butyl-perpivalate; t-butyl-per-2-ethylhexanoate; diisopropylperoxidicarbonate; di-2-ethylhexyl-peroxidicarbonate; dicyclohexyl-peroxidicarbonate; bis-(4-t-butylcyclohexyl)peroxydicarbonate; dimyristyl-peroxidicarbonate; dicetylperoxydicarbonate; di-(sec.-butyl)-peroxidicarbonate and the like.

From the group of redox systems, those which are suitable for initiating polymerisation include combinations of a peroxide with a tertiary amine and combinations of hydrogen peroxide or an organic hydroperoxide with a hydroxylamine or a hydroxamic acid, or with glucose or ascorbic acid or one of the following reducible sulphur compounds of low valency, namely $SO_2$ or one of the compounds characterised by the following general formulae:

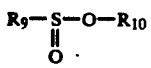

and

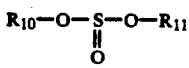

wherein $R_9$ denotes alkyl, hydroxyalkyl, cycloalkyl, aryl or alkylaryl groups having 1 to 18 carbon atoms, $R_{10}$ denotes hydrogen or alkyl radicals and $R_{11}$ independently denotes a straight chain or branched alkyl group which may be substituted or a cycloalkyl group having 5 to 18 carbon atoms (ring C+C substituents).

The sulphinic acids may also be used in the form of monomeric soluble salts corresponding to the following general formula

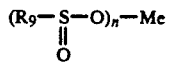

wherein Me preferably stands for ammonium, magnesium or zinc. Small quantities of nucleophilic compounds such as water or alcohols may also be added to the redox system.

It is preferred to use combinations in which one of the two components has a vapour pressure below 10 hPa, in particular below 3 hPa, at the reaction temperature so that it does not enter the condenser with the excess monomer vapour and cannot lead to polymerisation in the liquid phase.

The following are examples of the above-mentioned combinations of redox systems: Cumene hydroperoxide/$SO_2$; tert.-butylhydroperoxide/$SO_2$; dodecylhydroperoxide/$SO_2$; 1,4-diisopropylbenzene-dihydroperoxide/$SO_2$; 2,5-dimethylhexane-2,5-dihydroperoxide/$SO_2$; 1,4-diisopropylbenzenedihydroperoxide/$SO_2$ and the like.

In general, any known initiators which can be activated by heat or by a redox reaction may be used, provided they conform to the conditions mentioned above. For a choice of suitable peroxides, see in particular J. Brandrup and E. H. Immergut (Ed.), Polymer Handbook, 2nd Edition, Wiley, N.Y., 1975.

For the present invention, it is preferred to use initiators with which it is possible to reach reaction rates at which the mass of powder can be doubled within a time $\tau$ amounting to $<15$ hours, preferably $<10$ hours (e.g. from 0.3 to 8 hours).

Investigations of the reaction rate showed that, other reaction conditions being equal, the RP falls sharply with increasing product/seed ratio and may in some cases virtually come to a standstill.

Figure 2:
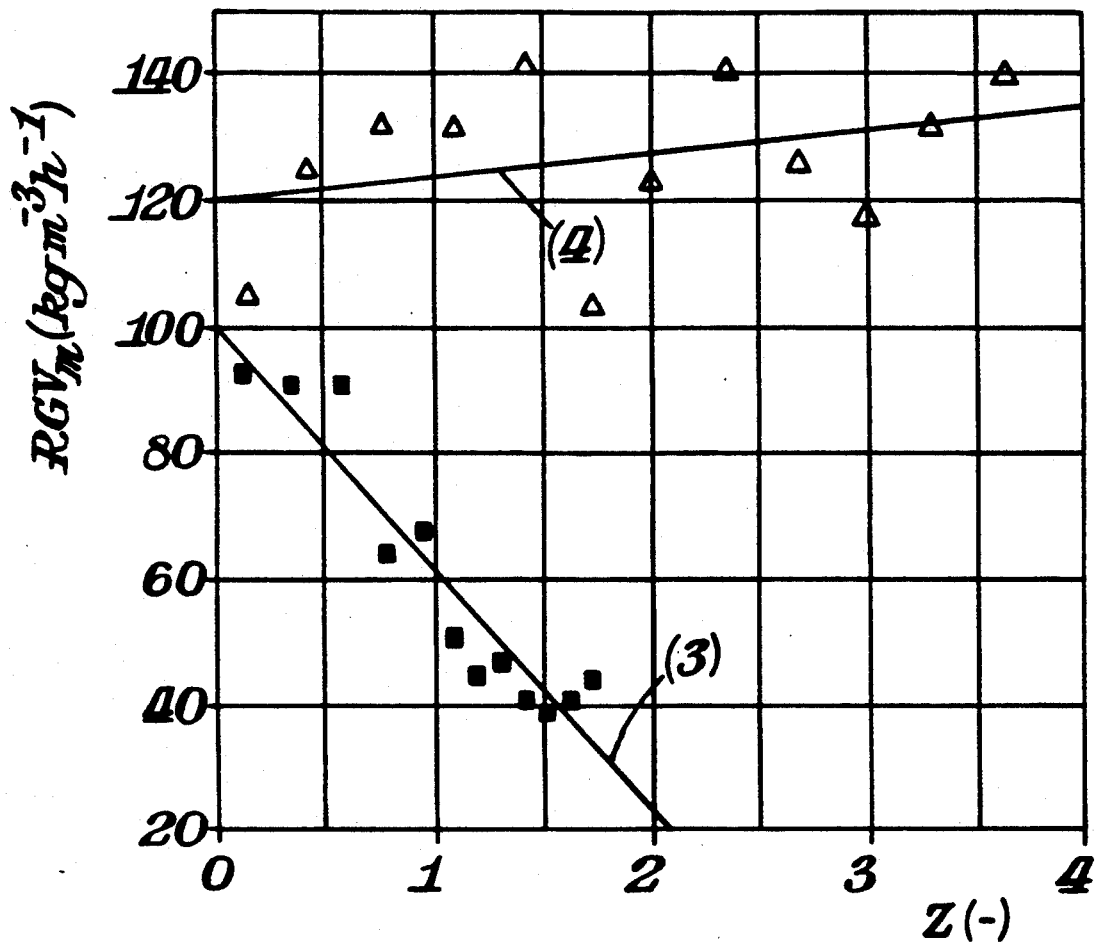
FIG. 2 illustrates a graphical representation of the relationship of the product/seed ratio z with the polymerization rate for Example 3 and Example 4.

It has now surprisingly been found that the RP remains constant even with increasing product/seed ratio if a mediator substance is added to the reaction system (see FIG. 2). Further, the addition of mediator substance produces a marked increase in the RP compared with that of polymerisations carried out under identical reaction conditions but without the addition of the mediator substance. The mediator substances used are organic, polar liquids, in particular amides, sulphoxides or sulphones, which are capable of swelling or, preferably, dissolving the polymer. For industrial processes, it is particularly preferred to use as mediator substance the solvent as that used for subsequent processing of the polymer, e.g. for spinning. Dimethylacetamide, dimethylsulphoxide and especially dimethylformamide have been found to be particularly suitable mediator substances. For a choice of substances with solubilizing properties for PAN-homo- or copolymers, see J. Brandrup and E. H. Immergut (Ed.), Polymer Handbook, 2nd Edition, Wiley, N.Y. 1975. N-Methylpyrrolidone, N-methylcaprolactam, tetramethylene sulphone and hexamethyl phosphoramide are further examples of suitable mediator substances. The quantity of mediator substance used should be so small that it does not alter the flow properties of the polymer powder and the PAN remains a free-flowing powder bed. In particular the quantity should be from 0.5 to 15% by weight, based on the polymer being produced, and should be kept within these limits in the course of the solvent-free polymerisation (if necessary with further addition of mediator substances (e.g. DMF) during the solvent-free polymerisation). The limits are preferably from 1 to 12% by weight, in particular from 3 to 10% by weight of mediator substance. Although, the PAN powder does still have good free-flowing flowability characteristics even at larger concentrations (>15%) of the mediator substance (e.g. DMF), such powders tend to cake in the further course of solid phase polymerisation.

It was highly surprising that the addition of mediator substances, e.g. DMF, results in a dramatic increase in reaction rate as well as in particular also in the product-/seed yield ratio and that the PAN powder does not become sticky. It is well known that the system of PAN powder/DMF solvent is very liable to stick and smear and special measures are normally required for dissolving PAN in DMF (see state of the art).

The molecular weight regulators used may be any of the substances commonly used for the homo- or copolymerisation of AN. Examples include mercaptans and aldehydes, in particular methyl mercaptan, octyl mercaptan, acetaldehyde and propionaldehyde, the latter being preferred.

The process according to the invention may be carried out in an apparatus illustrated in FIG. 1. This consists of a heatable reactor (1) which is optionally vacuum tight or pressure resistant and is equipped with a stirrer (2). The parts of the apparatus which come into contact with the monomer vapour under the reaction pressure should at least be heated to the reaction temperature to prevent uncontrolled condensation of the monomer vapour.

Since thorough agitating of the powder is important for the efficiency of the initiator, agitators or other mixing and fluidising devices (e.g. fluidised bed apparatus) are used which are particularly suitable for mixing and homogenizing powders as well as for incorporating liquids in powders. Anchor type and helical ribbon type agitators are particularly suitable for this purpose.

Fresh reaction solution is introduced into the reactor through the feed port (3). The reaction solution consists of all or some of the following components: AN, one or more comonomers, one or more initiators or initiator components, a mediator substance and one or more regulators. Freshly formed polymer may be discharged through a discharge part (4) which may consist, for example, of a screw and a powder chute. Excess monomer vapour is released through a control valve (5) to regulate the pressure. Any polymer powder which has got carried along by the vapour may be separated off either by means of velocity reduction in a stabilizing zone provided in the reaction apparatus or by means of a filter (6) arranged between the outlet of the reactor and the control valve. The pressure-released monomer vapour is liquefied in the condenser (7). The condensate may be recycled to the reactor by way of the pump (8) so that on re-evaporating it will take up and remove the heat of the reaction. The rate of supply from the pump (8) is controlled by means of a temperature measurement. When the temperature rises, the pump delivers (more) monomer into the reactor and when the temperature falls the supply stream is restricted. The condensate may be mixed with the feed (3) by means of the pump (9) in order to increase the dilution of the initiator and of the mediator substance and thus promote their uniform distribution in the powder. As already mentioned, the reactants may be introduced into the reactor separately and at different locations and in differing compositions. It has been found advantageous for this purpose to arrange the points of feed of the reactants below the surface of the powder bed.

Homo- and copolymerisations from the gaseous phase for technological processes have hitherto only been carried out at relatively high pressures. It was therefore surprising to find that polymerisation from the gaseous phase could be carried out satisfactorily at a partial pressure of the monomers in the sub-atmospheric range. It must be regarded as particularly surprising that the reaction can be greatly accelerated by the addition of a special mediator substance and does not come to a standstill after a relatively brief period of polymerisation. This observation is all the more surprising in view of the fact that the addition of various hydrocarbons, such as cyclohexane, also slows down the reaction. Another important finding is that when the mediator substances selected according to the invention are added, the reaction rates obtained remain high and substantially constant and the polymer obtained is virtually 100% from the gaseous phase, i.e. a polymer having a very high product/seed ratio may be obtained (experiments with ratios of up to 107:1 are given in the Examples). These findings are all the more unexpected since such results are not even obtained in the radical polymerisation process of vinyl chloride from the gaseous phase, which is a related process but carried out at a much higher reaction pressure.

The molecular weight (molecular mass) ($M_w$) of the products obtained by the process according to the invention is in most cases relatively high (e.g. 100,000 to 200,000 g/mol but may be considerably higher, e.g. 500,000 g/mol or more) and in spite of this, all the polymers are completely soluble in DMF at 80° C. and gel-free.

Suitable molecular weight regulators, such as propionaldehyde, acetaldehyde or alcohols (e.g. methanols) or, preferably, mercaptans, are capable of lowering the molecular weights without significantly reducing the reaction velocity, i.e. when a growing polymer chain breaks, this is preferentially accompanied by the starting of a new chain. Ketones such as acetone are inter alia less suitable as regulators since they bring about an increase in molecular weight. Regulators for reducing the molecular weight would be used especially for the production of conventional textile fibres from the polymers. The high molecular weights, in particular from >500,000 to about 3,000,000 g/mol, are used mainly for high modulus fibres or for PAN fibres which are to be worked up into carbon fibres.

In the state of the art, there are no known practical examples of homo- or copolymerisation of acrylonitrile from the gaseous phase which could be used as comparison experiments although the possibility of this reaction is mentioned in Offenlegungsschriften and Patent Specifications. These documents refer mainly to the polymerisation of vinyl chloride from the gaseous phase, which is underlined by the fact that the pressures and temperatures proposed for the gas phase reaction are within a range in which AN is not gaseous but liquid.

The main features of the process according to the invention are illustrated below with the aid of Examples.

A polymerisation rate (RP) is determined for assessing the results of the solid phase polymerisation in the Examples. This RP may be determined as an average value from the gravimetrically determined increase in mass of the polymer throughout the experiment. Alternatively, the RP may be determined as an instantaneous value by measuring the difference within a measuring period between the volume of liquid monomer introduced into the reactor and the volume of the expanded monomer reliquefied in the condenser.

The RP may be given in terms of mass or volume. If it is based on the mass of the polymer powder present in the reactor, the reciprocal of this value is the time required to double the mass of powder. If the bulk density $\phi_s$ of the powder is known, the RP based on mass may be used to calculate the RP based on the volume of the motionless powder bed, i.e. of the powder bed which is not agitated or fluidised. The actual RP, i.e. the velocity based on the volume effectively occupied by the stirred powder bed, is smaller (than the RP based on the volume of the motionless powder) by that factor by which the powder volume increases when stirred up. The magnitude of this factor depends on the nature of the powder and the method of mixing the powder.

In the Examples which follow, the measure for comparison is the reciprocal value of the RP based on the powder mass at the beginning of the experiment and the RP based on the corresponding volume of the motionless powder.

EXAMPLES 1-3 (WITHOUT MEDIATOR SUBSTANCE)

Example 1

The apparatus used was a 1.8 l reactor of refined steel equipped with an anchor agitator having a very small wall distance, a pressure gauge and thermocouples. A mass $m^o=60$ g of a PAN seed powder was introduced into the reactor. The seed powder was a PAN homopolymer powder obtained by precipitation polymerisation ($\eta_{rel}=2.19$ (0.5% by weight of PAN in DMF measured at 25° C., particle size about 14–16 μm (median ($X_{50}$) value)). The reactor filled with seed powder was evacuated and adjusted to a reaction temperature of 60° C. with stirring. The cooled reaction solution consisting of monomer and initiator was directly introduced into the stirred powder bed through a cooled feed conduit and an opening (e.g. about 1 mm in diameter) which was situated in the reactor at a level below the surface of the stirred powder. The reaction solution consisted of AN in which dicyclohexyl-peroxy-dicarbonate (CHPC, commercially pure powder, Peroxid-Chemie GmbH, Höllriegelskreuth) was dissolved at a concentration $c_I$ of 1.25 kg/m³ of AN. The reaction solution was introduced into the reaction zone at the volumetric rate $\dot{V}_I$ of 18 ml/h. After a pressure $P_M$ of 500 hPa had been reached, which corresponds to a saturation $P_M/P_M^o$ of 0.93 as the saturation vapour pressure $P_M^o$ is about 540 hPa, the reaction pressure was kept constant for the whole reaction time. This was achieved by the release of excess vapour into a condenser by means of a pressure controlled, motor driven valve. After a reaction time of 5.5 h, the reaction was terminated (termination of the experiment) by evacuation followed by ventilation of the reactor.

The increase in mass $\Delta m$ of the polymer powder was 67 g, which corresponds to a product/seed ratio $z=\Delta m/m^o$ of 1.12. 0.20 g of the polymer was thus formed per g of seed substance and h of reaction time, which corresponds to a time $\tau$ of 5 h required for doubling the mass of powder.

The bulk density of the powder was determined by introducing the powder into a measuring cylinder and compacting the powder by stamping the measuring cylinder 30 times on a support of hard rubber. The bulk density $\phi_s^{product}$ of the powder obtained was 410 kg/m³. Thus at a reaction temperature of 60° C., a reaction pressure of 500 hPa and a feed rate of initiator (FRI) based on the volume of the motionless seed powder bed, $$FRI=c_I*\dot{V}_I*\phi_s^{seed}/m^o,$$

of FRI=75 g m$^{-3}$ h$^{-1}$, the polymerisation rate RPvol obtained, which was similarly based on the volume of the motionless seed powder bed, $$RPvol=\Delta m*\phi_s^{seed}/(m^o*t),$$

was found to be RPvol=41 kg m$^{-3}$h$^{-1}$.

Example 2

Example 2 was carried out in the same manner as Example 1 but the polymerisation initiator used was di-2-ethylhexyl-peroxydicarbonate (EHPC, 75% solution in aliphatic solvents, Peroxid-Chemie GmbH, Höllriegelskreuth). 0.98 kg of EHPC/m³ of AN were dissolved in liquid AN. The solution was introduced into the reactor at a volumetric rate of 41.2 ml/h. This corresponds to an initiator feed rate (FRI) of 135 g.m$^{-3}$.h$^{-1}$. After a reaction time of 6 h, the increase in weight of polymer was 68 g. This corresponds to a product/seed ratio of 1.14, a time $\tau$ of 5.3 and an RPvol of 38 kg m$^{-3}$.h$^{-1}$.

Example 3

Example 3 was carried out in the same manner as Example 1 and using the same pressure and temperature conditions and the same initiator but with a higher initiator feed rate than in Example 1. 1.7 kg of CHPC/m³ an AN were dissolved in liquid AN. This solution was delivered into the reactor at a volumetric rate of 35 ml/h. This corresponds to an initiator feed rate of 198 g m$^{-3}$ hA$^1$. After a reaction time of 6 h, the increase in polymer mass was 96 g. This corresponds to a product/seed ratio of 1.6, a time $\tau$ of 3.8 h and an RPvol of 53 kg m$^{-3}$ h$-1$.

In this example, the instantaneous RP (RPvol$_m$) based on the volume of the motionless seed powder was also determined. It was calculated as described above from the AN consumption, which was determined every 30 minutes. The results are presented in FIG. 2 as a function of the product/seed ratio z. It will be seen that the RPvol$_m$ decreases continuously with increasing product/seed ratio z.

EXAMPLES USING MEDIATOR SUBSTANCE

Example 4

In this example, dimethylformamide (DMF) was added to the reaction solution as mediator substance, with the result that, in contrast to Example 3, the RP did not decrease during the reaction time.

The example was carried out in a manner analogous to that of the preceding Examples. A mixture of AN and DMF was prepared. The DMF concentration was 5.7 vol.-%. CHPC was dissolved in the AN/DMF mixture at a concentration of 1.13 kg/m³ of volume of the AN/DMF mixture. The cooled solution was introduced into the reactor at a volumetric rate of 62.8 ml/h. This corresponds to an initiator feed rate of 236 g.m$^{-3}$.m$^{-1}$. After a reaction time of 6 hours, the increase in polymer mass was 213 g (calculated solvent free). This corresponds to a product/seed ratio of 3.5, a time $\tau$ of 1.7 h and an RPvol of 118 kg. m$^{-3}$. h$^{-1}$.

The instantaneous RP (RPvol$_m$) was determined in Example 4 in the same manner as in Example 3. The results are shown in FIG. 2 together with those of Example 3.

It will be seen that when mediator substance (MS) is used, the RPvol$_m$ no longer decreases with the product-/seed ratio z, i.e. it remains constant. The RP of product formation is considerably greater than that obtained without MS.

Example 5

Example 5 was carried out in the same manner as Example 4 but with a smaller quantity of mediator substance DMF in the reaction solution, namely 4.8 vol. %, and a larger quantity of initiator CHPC, namely 1.7 kg of CHPC/m$^3$ of volume of the AN/DMF mixture. The reaction solution was introduced into the reactor at a volumetric rate of 70 ml/h, which corresponds to an initiator feed rate of 397 g.m$^{-3}$.h$^{-1}$. After a reaction time of 6 h, the increase in mass of polymer was 246 g. This corresponds to a product/seed ratio of 4.1, a time $\tau$ of 1.5 h and an RPvol of 137 kg.m$^{-3}$.h$^{-1}$.

Examples 6 to 10 (Reaction sequence using the PAN polymer from, in each case, the preceding experiment)

In the experiments carried out in these Examples, a polymer powder having a very high product/seed ratio was prepared by using as seed substance of each experiment the product obtained in the preceding experiment. The mass m$^o$ of the seed substance was chosen so that the volume of powder calculated from the bulk density $\rho_s^{seed}$ was about 300 ml at the beginning of the experiment.

The reaction temperature was set at 60° C. and the AN partial pressure at 490 hPa. The reaction solution differed from that of Example 5 by the addition of propionaldehyde as molecular weight regulator. The reaction solution consisted of 94.34 vol-% of AN, 4.72 vol-% of DMF and 0.94 vol-% of propionaldehyde. CHPC was dissolved in this mixture at a concentration of 1.7 kg/m$^3$. The reaction solution was introduced into the reactor at a volumetric rate of about 70 ml/h, which corresponds to an initiator feed rate of 397 g.m$^{-3}$.h$^{-1}$.

The results of Examples 6 to 10 are summarized in Table 1.

In Example 6 (beginning of experiment), a mass m$^o$ of 60 g of the seed powder also used in Example 1 was introduced into the reactor. After a reaction time $t_R$ of 6 h, the increase in mass $\Delta m$ of the polymer was 235 g. This corresponds to a product/seed ratio z of 3.9, a time $\tau$ of 1.5 h and an RPvol of 130 kg.m$^{-3}$.h$^{-1}$. The bulk density $\tau_s^{product}$ of the product was 620 kg/m$^3$.

In Example 7, 190 g of the PAN solid powder obtained in Example 6 were introduced into the reactor. After a reaction time of 6 h, the increase in mass of polymer was 224 g. The product/seed ratio was thus 9.7, the time $\tau$ 5.1 h and the RPvol 122 kg m$^{-3}$ h$^{-1}$. bulk density $\tau_s^{product}$ of the product was 720 kg/m$^3$.

In Example 8, 216 g of the PAN solid powder obtained in Example 7 were introduced into the reactor. After a reaction time of 8.5 h, the increase in mass of the polymer was 343 g. The product/seed ratio was thus 26.7, the time $\tau$ was 5.4 h and the RPvol was 134 kg.m$^{-3}$.h$^{-1}$. The bulk density $\tau_s^{product}$ of the product was 756 kg/m$^3$.

In Example 9, 227 g of the powder obtained in Example 8 were introduced into the reactor. After a reaction time of 6 h, the increase in mass of the polymer was 219 g. The product/seed ratio was thus 53.5, the time $\tau$ was 6.2 h and the RPvol was 122 kg.m$^{-3}$.h$^{-1}$. The bulk density $\rho_s^{product}$ of the product was 718 kg/m$^3$.

In Example 10, 216 g of the powder obtained in Example 9 were introduced into the reactor. After a reaction time of 6 h, the increase in mass of the polymer was 211 g. The product/seed ratio was thus 107, the time $\tau$ was 6.1 h and the RVvol was 117 kg.m$^{-3}$.h$^{-1}$. The bulk density $\rho_s^{product}$ of the product was 690 kg/m3.

A product/seed ratio of 107 corresponds to the presence in the polymer powder of 0.9% of the PAN seed powder originally used in experiment 6.

The experiments were broken off at this stage (experimental period one week with daily interruptions) since the RP and the polymer yield continued to stay at about the same high level.

TABLE 1

|  |  | No. | | | | |
|---|---|---|---|---|---|---|
|  |  | 6 | 7 | 8 | 9 | 10 |
| m$^o$ | g | 60 | 190 | 216 | 227 | 216 |
| Ps$^{seed}$ | kg/m$^3$ | 200 | 620 | 720 | 756 | 718 |
| FRI | g·m$^{-3}$·h$^{-1}$ | 402 | 385 | 399 | 400 | 397 |
| t$_R$ | h | 6 | 6 | 8.5 | 6 | 6 |
| $\Delta$m | g | 235 | 224 | 343 | 219 | 211 |
| (Rho)$_s$ product | kg/m$^3$ | 620 | 720 | 756 | 718 | 690 |
| z | — | 3.9 | 9.7 | 26.7 | 53.5 | 107 |
| $\Delta$m/(m$^{o*}$t) | h$^{-1}$ | 0.65 | 0.20 | 0.19 | 0.16 | 0.16 |
| $\tau$ | h | 1.5 | 5.1 | 5.4 | 6.2 | 6.1 |
| RP$_{vol}$ | kg·m$^{-3}$·h$^{-1}$ | 130 | 122 | 134 | 122 | 117 |

Example 11 (Copolymerisation)

AN was polymerised together with acrylic acid methyl ester (AME) used as comonomer. The reaction was carried out in the usual manner at a temperature of 60° C. and a reaction pressure of 470 hPa. 60 g of the seed powder which was also used in Example 1 were introduced into the reactor. The reaction solution was composed of 86.54 vol.-% of AN, 9.62 vol.-% of AME and 3.85 vol.-% of DMF. CHPC was dissolved in this solution at a concentration of 1.25 kg/m$^3$ of volume of the mixture of AN, AME and DMF. The reaction solution was introduced into the reactor at a volumetric rate of 107.4 ml/h. This corresponds to an initiator feed rate of 447 g.m$^{-3}$.h$^{-1}$. After a reaction time of 6 h, the increase in mass of the polymer was 279 g. This corresponds to a product/seed ratio of 4.6, a time $\tau$ of 1.3 h and an RPvol of 155 kg m$^{-3}$.h$^{-1}$.

When dimethylformamide is replaced by dimethylacetamide (DMA) or DMSO (dimethylsulphoxide) in experiments 4 to 11, virtually the same results are obtained.

Example 12 (Initiation with a redox system)

In this case, a redox system consisting of tertiary butyl hydroperoxide (tBHP) and sulphur dioxide (SO$_2$) was used for initiating the reaction. The initiator components were dissolved separately in AN and introduced at different points into the reaction vessel which was also used in the preceding Examples. The opening through which the tBHP/AN solution entered the reaction zone was situated in the reactor wall at a level below the surface of the powder bed. The AN/SO$_2$ mixture was introduced into the reaction zone through a conduit entering vertically into the powder bed. The feed conduit for the AN/SO$_2$ mixture was heated so that AN and SO$_2$ entered the reactor in the gaseous form.

The example was carried out in a manner analogous to that of the preceding examples but without a mediator substance. The reaction temperature was 60° C. and the reaction pressure 500 hPa. 50 g of the seed powder also used in Example 1 were introduced into the reactor. tBHP (80%, liquid, Peroxid-Chemie GmbH, Höllriegelskreuth) was dissolved in AN at a concentration of 15.3 kg/m$^3$. This solution was introduced into the reaction chamber at a volumetric rate of 12 ml/h. This corresponds to an initiator feed rate (relating to tBHP) of 734 g.m$^{-3}$.h$^{-1}$. SO$_2$ was dissolved in AN at a concentration of 128 kg/m$^3$. This solution was introduced into the reaction zone at a volumetric rate of 60 ml/h. After a reaction time of 6 h, the increase in mass was 110 g. This corresponds to a product/seed ratio of 2.2, a time $\tau$ of 2.7 h and an RPvol of 73 kg.m$^{-3}$.h$^{-1}$.

The acid content both of the seed powder and of the product was determined by potentiometric titration after ion exchange (mixed bed exchange). The samples of the two powders were dissolved in dimethyl sulphoxide for this purpose. The total acid content in the seed powder was 50 milliequivalents per kg (mequiv./kg) and that in the product was 94 mequiv./kg. The quantity of strong acid was 15.7 mequiv./kg in the seed powder and 39.2 mequiv./kg in the product. This means that SO$_2$ was incorporated in the PAN polymer in the form of strong acid groups. PAN fibres (in particular those spun from the polymer) may therefore be dyed with basic dyes without specific acid comonomers having been deliberately incorporated in the polymer.

We claim:

1. Process for the preparation of polyacrylonitrile homopolymers and polyacrylonitrile copolymers having at least 85% acrylonitrile by solid phase polymerization of acrylonitrile from the gaseous phase in the presence of initiators and solids previously introduced into the reactor, wherein a) acrylonitrile, alone or together with other copolymerizable monomers,
   b) is reacted under pressure and temperature conditions at which acrylonitrile and optionally comonomers are present in thermodynamic equilibrium conditions in a gaseous or sorbed stated at 30° to 120° C., and under an acrylonitrile partial pressure of from 80 to 3200 hPa and
   a saturation value $P_M/P_{M^0}$, which is the ratio of actual vapor pressure $P_M$ to saturation vapor pressure $P_{M^0}$ monomer or monomers, of from 0.5 to 0.97, with substantial exclusion of oxygen,
   c) in the presence of a polyacrylonitrile polymer or a polyacrylonitrile copolymer as pulverulent seed polymer
   d) and in the presence of initiators which are virtually non-volatile under the reaction conditions,
   e) in the presence of liquid mediator substances which are solvents or powerful swelling agents for PAN homo- or copolymers selected from the group consisting of highly polar organic amide, sulphoxide, sulfone and phosphoramide solvents, which are used in quantities of from 0.1 to 15% by weight, whereby the seed polymer c) remains in a stirrable pulverulent form,
   f) and optionally in the presence of inert gases to produce pulverulent polyacrylonitrile polymers or polyacrylonitrile copolymers at a high reaction rate which leads to doubling of the initial seed powder within a time of less than 15 hours, liquid acrylonitrile and optionally comonomers being introduced on or into the initially introduced polyacrylonitrile polymer or polyacrylonitrile copolymer which is kept in motion, and the saturation value $P_M/P_{M^0}$ being regulated to keep it within the aforesaid limits, excess monomer being condensed outside the reactor, and the initiators and optionally mediator substances being continuously or intermittently introduced in at least one of the inflow streams.

2. Process according to claim 1 wherein the temperature in b) is 40° to 90° C.

3. Process according to claim 1, characterised in that temperatures from 45° to 70° C. are observed as temperature condition b).

4. Process according to claim 1, characterised in that a saturation value $P_M/P_M^0$ from 0.75 to 0.97 is maintained.

5. Process according to claim 1, characterised in that dimethyl acetamide, dimethyl formamide or dimethyl sulphoxide is used as mediator substance.

6. Process according to claim 1, characterised in that the initiators used are redox initiators in which one component is virtually non-volatile and the components are introduced into the reactor through separate conduits.

* * * * *